United States Patent [19]
Goodman et al.

[11] Patent Number: 5,951,902
[45] Date of Patent: Sep. 14, 1999

[54] METHOD AND APPARATUS FOR ELECTROFUSING THERMOPLASTIC

[75] Inventors: Bradley A. Goodman; Charles Pollum, both of Harmony; Duane D. Guthrie, Zelienople, all of Pa.

[73] Assignee: Kerotest Manufacturing Corp., Pittsburgh, Pa.

[21] Appl. No.: 08/999,041

[22] Filed: Dec. 29, 1997

[51] Int. Cl.⁶ ................................................ H05B 3/44
[52] U.S. Cl. ........................................ 219/544; 219/543
[58] Field of Search ................................. 219/544, 543, 219/488, 490, 492, 497, 243; 156/499, 304.2

[56] References Cited

U.S. PATENT DOCUMENTS

| | | |
|---|---|---|
| 4,455,482 | 6/1984 | Grandclement . |
| 4,595,433 | 6/1986 | Ford et al. ................................. 156/64 |
| 4,684,417 | 8/1987 | Grandclement . |
| 4,753,404 | 6/1988 | Grandclement . |
| 4,978,837 | 12/1990 | Eggleston ................................. 219/497 |
| 5,086,213 | 2/1992 | Nussbaum et al. . |
| 5,107,098 | 4/1992 | D'Auria . |
| 5,138,136 | 8/1992 | Moreau et al. . |
| 5,140,137 | 8/1992 | D'Auria . |
| 5,357,083 | 10/1994 | D'Auria . |
| 5,369,248 | 11/1994 | Dufour et al. . |
| 5,529,656 | 6/1996 | Ewen et al. ........................... 156/273.9 |
| 5,744,934 | 4/1998 | Wu .......................................... 320/111 |

*Primary Examiner*—Teresa Walberg
*Assistant Examiner*—Vinod D. Patel
*Attorney, Agent, or Firm*—Kirkpatrick & Lockhart LLP

[57] ABSTRACT

The present invention is directed to a method for creating an electrofused union between a plurality of thermoplastic members, with at least one of the members having an embedded electrically resistive element. The method includes the steps of generating a direct current voltage from a direct current power supply and transmitting the direct current voltage to the electrically resistive element. The present invention also contemplates an electrofusion system.

20 Claims, 5 Drawing Sheets

METHOD AND APPARATUS FOR ELECTROFUSING THERMOPLASTIC

I. CROSS REFERENCE TO RELATED APPLICATIONS (Not Applicable)

II. STATEMENT REGARDING FEDERALLY SPONSORED RESEARACH OR DEVELOPMENT (Not Applicable)

III. BACKGROUND OF THE INVENTION

1. Field of the Invention

The present invention is directed generally to systems for electrofusing thermoplastic, and, more particularly, to a cordless apparatus for electrofusing thermoplastic.

2. Description of the Background

Because of its low cost, durability, and relative ease of installation, polyethylene thermoplastic pipe has become a commonly accepted mode of distribution of natural gas and water in both residential and commercial applications. Unions between two pieces of thermoplastic pipe and branch connections between a main pipe and a branch pipe are commonly made through the use of electrofused unions.

Electrofusing is especially useful in forming branch connections or for tapping into main pipelines. A thermoplastic tapping tee can be placed on the main pipe and electrofused to the main pipe to create a leaktight weld between the main pipe and the tapping tee. The main pipe is then perforated by a perforation device located in the tapping tee. A branch pipe is connected to the tapping tee and the desired tapped-in connection is thus established.

A typical tapping tee 1 and apparatus 2 for electrofusing thermoplastic pipe from the relevant art are illustrated in FIG. 5. The tapping tee 1 in FIG. 5 contains electrically resistive elements which are embedded in its thermoplastic. When an electric current is supplied by the electrofusion apparatus 2 through a pair of leads 3 to the resistive elements, the fusible portions of the tee 1 and portions of a main pipe 4 melt and create leaktight welds between the tee 1 and the main pipe 4. The connectors on the tee 1 for accepting the leads 3 contain fusion wells. When the resistive elements generate heat, molten plastic from the tee 1 and the main pipe 4 is forced into the fusion wells. Pressure from the molten plastic causes microswitches in the leads to signal the electrofusion apparatus 2 to cease supplying electrical current to the tee 1 to indicate the electrofusion is complete. Such switches are illustrated in U.S. Pat. No. 4,684,417 to Grandclement, which is incorporated herein by reference.

The electrofusion apparatus 2 shown in FIG. 5 uses an alternating current source 5 to generate the current required to form the electrofused joint. The apparatus 2 shown in FIG. 5 has the disadvantage that it must be connected to the alternating current source 5, which may not be readily available to a contractor or a pipe installer in a remote location. Use in a remote location would thus require the use of an alternating current generating source, such as a gasoline powered or other powered generator. Such generators are expensive, difficult to transport, difficult to service, a potential safety hazard, unreliable, and potentially dangerous. Also, because the electrofusion apparatus 2 of FIG. 5 accepts alternating current, it must "clip" the alternating current supplied to it to make a root mean square (RMS) voltage or it must convert the alternating current to direct current. Thus, the apparatus 2 is bulky, expensive and may be cumbersome to handle and use in field applications.

IV. SUMMARY OF THE INVENTION

The present invention, according to its broadest implementation, is directed to a method for creating an electrofused union between a plurality of thermoplastic members, with at least one of the members having an embedded electrically resistive element. The method includes the steps of generating a direct current voltage from a direct current power supply and transmitting the direct current voltage to the electrically resistive element.

The present invention also contemplates an electrofusion system. The system includes a direct current power supply and a fuse current circuit responsive to the direct current power supply. The fuse current circuit generates a direct current voltage. The system also includes at least one thermoplastic member having an electrically resistive element. The system further includes at least one electrical lead connected to enable dc current to flow between the fuse current circuit and the resistive element.

The present invention further contemplates an electrofusion apparatus. The apparatus includes a direct current power supply and a fuse current circuit responsive to the direct current power supply. The fuse current circuit generates a direct current voltage. The apparatus further includes at least one electrical lead connected to enable dc current to flow between the fuse current circuit and the resistive element.

The present invention represents a substantial advance over prior methods and electrofusion systems. Because the present invention uses a direct current power source, it is smaller, more durable, less expensive to manufacture, more reliable, easier to use, and lighter in weight than alternating current electrofusion systems. The present invention also has the advantage that, because there is no electrical "noise" introduced due to an alternating current line supply voltage, the output current and voltage can be regulated with a high degree of accuracy, thereby improving fusion quality. The present invention also has the advantage over prior attempts at eliminating an alternating current power source for electrofusion in that the direct current power source can be easily replaced or recharged when it reaches the end of its useful life. The present invention has the further advantage that the direct current power source is relatively lightweight and compact. The present invention also has the advantage that the direct current power source is a long lasting power source. Those, and other advantages and benefits of the present invention, will become apparent from the Detailed Description of the Invention hereinbelow.

V. BRIEF DESCRIPTION OF THE DRAWINGS

For the present invention to be clearly understood and readily practiced, the present invention will be described in conjunction with the following figures, wherein.

VI. DETAILED DESCRIPTION OF THE INVENTION

Figure 1:
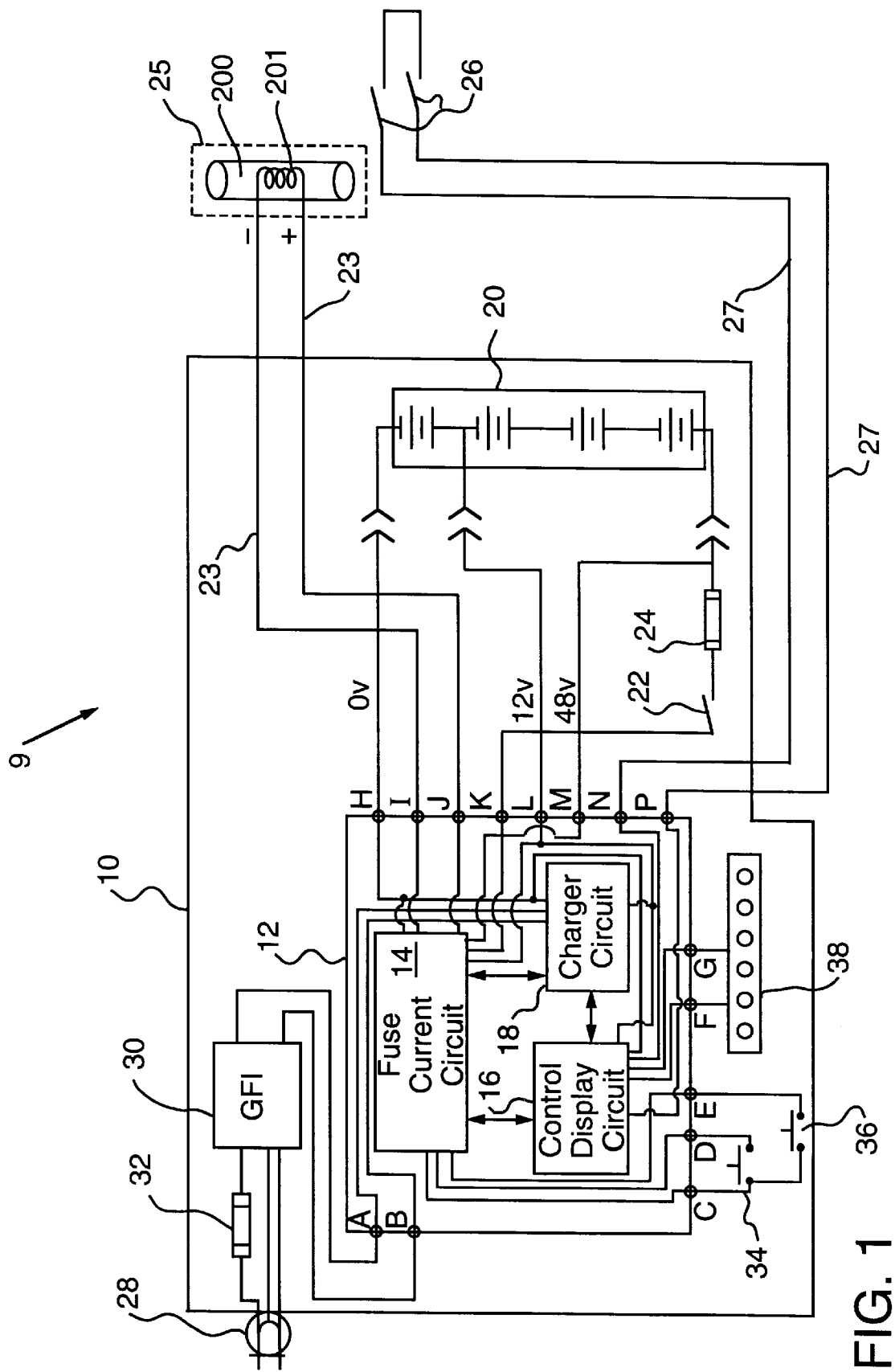
FIG. 1 is a diagram illustrating the electrofusion system of a preferred embodiment of the present invention.

FIG. 1 illustrates an electrofusion system 9 of a preferred embodiment of the present invention. The system 9 includes an electrofusion apparatus 10. The apparatus 10 includes a main circuit 12 which provides the requisite current to a thermoplastic member which is to be electrofused to another thermoplastic member by means of a fuse current circuit 14. It can be understood by those skilled in the art that the thermoplastic members may be of any type of thermoplastic fitting, junction, or pipe such as, for example, couplings, tapping tees, high volume tapping tees, reducer couplings, medium volume tapping tees, branch saddles, repair saddles, or lengths of pipe. The main circuit 12 also includes a control/display circuit 16 which receives user input and outputs the status of the apparatus 10 to various display devices as described below. The main circuit further includes a charger circuit 18 which is used to charge a direct current power source 20. In the preferred embodiment illustrated in FIG. 1, the main circuit 12 is constructed of discrete and analog devices on a printed circuit board. It can be understood by those skilled in the art that the main circuit 12 may be constructed on, for example, an application specific integrated circuit (ASIC), a substrate having thick film or thin film devices or a substrate having a hybrid mixture of thick film devices, thin film devices, analog devices, and/or discrete devices. Also, in the preferred embodiment of the main circuit 12 of FIG. 1, all logic circuits are implemented in complementary metal oxide semiconductor (CMOS) technology. However, it can be understood by those skilled in the art that such logic technology as, for example, transistor-transistor logic (TTL), bipolar logic, or gallium-arsenide (GaAs) logic can be used.

The direct current power source 20 supplies 12 volts to terminal L of the main circuit 12 that is used by the main circuit 12 for circuit operation. The direct current power source 20 also supplies a higher voltage, which in the preferred embodiment shown in FIG. 1 is 48 volts, to terminal M of the main circuit 12. The fuse current circuit 14 utilizes the 48 volts to generate the current required to energize a resistive element in a thermoplastic member. In the preferred embodiment shown in FIG. 1, the direct current power supply 20 is constructed of four rechargeable 12 volt batteries connected in series. This arrangement is convenient because the 12 volts needed for operation of the main circuit 12 and the 48 volts needed by the fuse current circuit 14 to generate the fusion current are provided. It can be understood by those skilled in the art that the direct current power supply 20 can be constructed using any arrangement of batteries which will provide approximately 48 volts to the fuse current circuit 14, even if the output of the direct current power supply 20 must be "stepped up" or "stepped down" in voltage. Also, it can be understood by those skilled in the art that the batteries in the direct current power source 20 may be disposable or rechargeable batteries which are constructed using, for example, nickel-cadmium, lead-acid, lithium, or alkaline battery technologies.

The ground terminal of the direct current power source 20 is connected to terminal H of the main circuit 12. An on/off switch 22, which is connected between the direct current power source 20 and terminal K of the main circuit 12, allows the power from the direct current power source 20 to be interrupted. A fuse 24 is provided to protect the main circuit 12 from excessive current output from the direct current power source 20.

The fuse current circuit 14 supplies a current through leads 23 to a load 25 (the thermoplastic member 200 and electrically resistive element 201) at terminals I and J of the main circuit 12. Switches 26, which are at one end of a pair of leads 27, are connected between the thermoplastic member and terminals N and P of the main circuit 12. The switches 26 are used to signal the electrofusion apparatus 10 that a complete electrofused joint has been formed. It can be understood by those skilled in the art that the switches 26 can be, for example, pressure responsive microswitches, electro-optic switches, or manually operated switches. It can also be understood by those skilled in the art that a bar code reader or a magnetic card reader may be used in place of or in addition to the switches 26. Such bar code or magnetic card readers could be capable of reading information such as general data (i.e. operator name, organization name, date, etc.) and/or fusion data (i.e. pipe diameter, fitting type, manufacturer, voltage output, welding time, etc.). In operation, the electrofusion apparatus 10 employing a bar code or magnetic card reader makes an ohmic control check of the thermoplastic member to which it is connected and compares the ohmic value to that in the fusion data to determine if they match. Then, a timer is used to determine when to cease supplying electrical current to the thermoplastic member.

Alternating current power may be supplied to the charger circuit 18 to charge the direct current power source 20 via plug 28. A ground fault interrupt circuit 30 and a fuse 32 are connected between the plug 28 and terminals A and B of the main circuit 12 to protect the main circuit 12 from a power spike or a current overload.

A start switch 34 is connected between terminals C and D of the main circuit 12. When the start switch 34 is closed, the fuse current circuit 14 supplies current to the thermoplastic member. A stop/reset switch 36 is connected between the start switch 34 and terminal E of the main circuit 12. When the stop/reset switch 36 is closed, the fuse current circuit 14 will cease supplying current to the thermoplastic member if the fuse current circuit 14 had previously been activated. Although the switches 34 and 36 are depicted as push button switches in the preferred embodiment shown in FIG. 1, it can be understood by those skilled in the art that the switches 34 and 36 can be any type of switch that is suitable. The switches 34 and 36 can be, for example, toggle switches, rotary switches, or slide switches.

A display device 38 is connected between terminals F and G of the main circuit 12. The display device 38 is activated by the control/display circuit 16 to indicate the status of the electrofusion apparatus 10. The display device 38 is shown as a series of light emitting diodes (LEDs) in the preferred embodiment shown in FIG. 1. The LEDs in the display device 38 represent the charge state of the direct current source 20 (half (50%) charged or fully (100%) charged), whether the electrofusion apparatus has overheated, whether a fault has occurred in the main circuit 12, and the status of operation of the fuse current circuit 14 (fusion on or fusion end). It can be understood by those skilled in the art that the display device may include any type of suitable display components such as, for example, liquid crystal displays (LCDs), gauges, indicator lights, or meters.

The electrofusion apparatus 10 can be packaged in a case constructed of a durable material such as, for example, high impact plastic or metal. Such a case provides a solid chassis to which the components of the apparatus 10 can be anchored. The case also provides a weathertight barrier and protects the apparatus 10 from extreme temperatures. The leads 23 and 27 are stored in the case to prevent damage and operating instructions are printed inside the case so that the instructions are available for each use of the apparatus 10.

Figure 2:
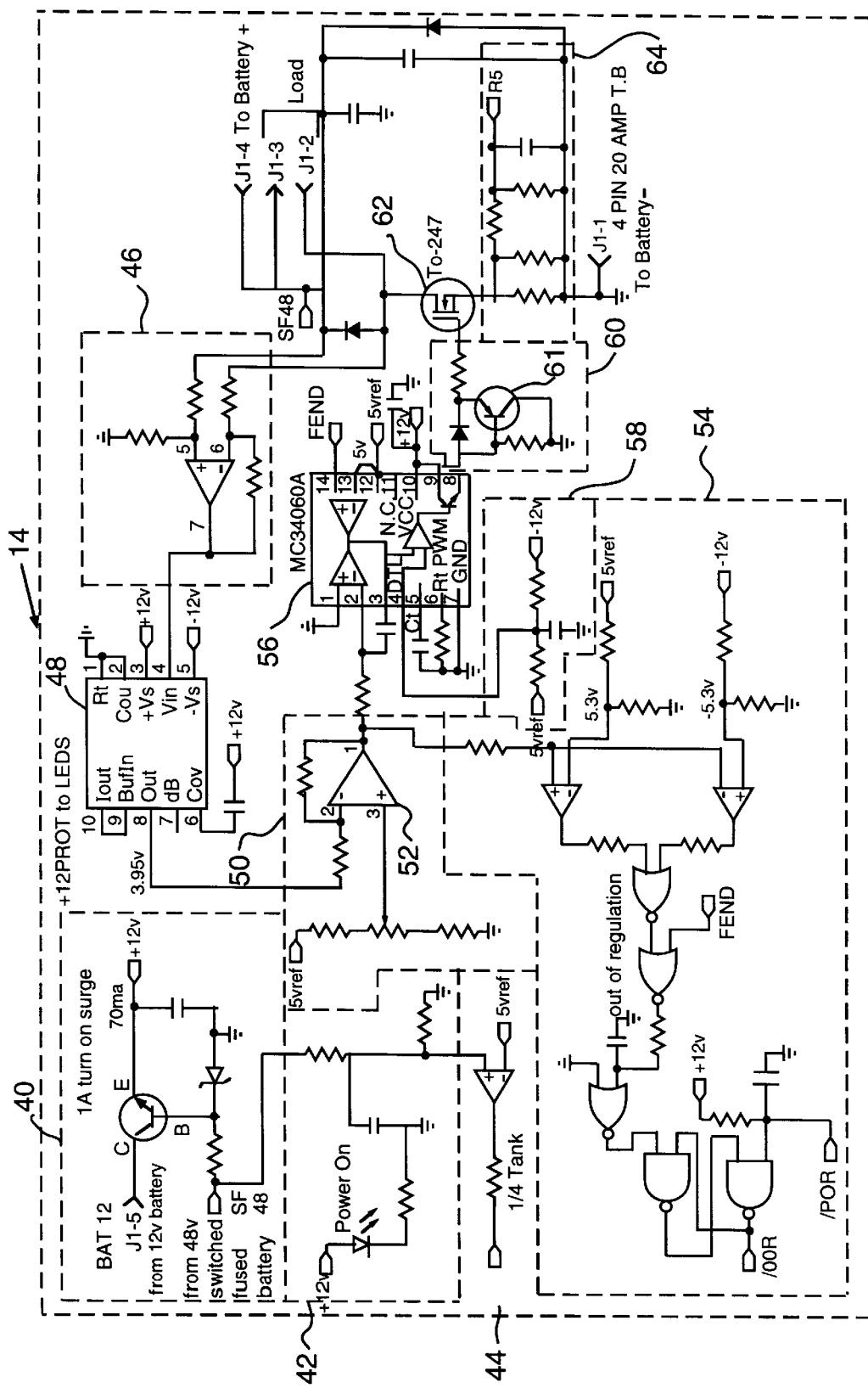
FIG. 2 is a circuit schematic of a preferred embodiment of the fuse current circuit of the electrofusion apparatus of FIG. 1.

FIG. 2 illustrates a circuit schematic of a preferred embodiment of the fuse current circuit 14 of FIG. 1. The fuse current circuit 14 is designed to produce 39.5 volts (±2%) to a thermoplastic member, denoted as "LOAD" in FIG. 2, via a pair of leads 23. The voltage supplied to the member is fed back to the fuse current circuit 14 and is used to adjust the output voltage of the fuse current circuit 14 to regulate it at 39.5 volts (±2%).

A 12 volt battery protection circuit 40 is provided to protect the portions of the main circuit 12 which operate on 12 volts from power surges when the electrofusion apparatus 10 is activated by switching the on/off switch 22. A power on indicator circuit 42 illuminates a light emitting diode when the electrofusion apparatus 10 is activated by switching the on/off switch 22. A low battery detection circuit 44 compares the charge on the direct current power source 20 with a reference voltage and generates a signal if the direct current power source 20 is below one-quarter of its normal charge.

The voltage from the load (thermoplastic member) is fed back into an instrumentation amplifier circuit 46. The voltage of the output of the instrumentation amplifier circuit 46 is one-tenth the voltage of the voltage seen by the load. For example, if the voltage seen by the load is 40 volts, the output of the instrumentation amplifier circuit 46 is 4 volts.

The output of the instrumentation amplifier circuit 46 is input to an RMS to DC converter circuit 48 which converts the root mean square voltage that is seen by the load to a dc voltage. The output of the RMS to DC converter circuit 48 is input to an error circuit 50. The error circuit 50 uses a differential amplifier 52 to compute the difference between the scaled down voltage that is output from the RMS to DC converter circuit 48 and a reference voltage. In the preferred embodiment, the reference voltage used throughout the main circuit 12 is 5 volts.

The output of the error circuit 50 is input to an out of regulation circuit 54 which generates an out of regulation signal when the error between the scaled down voltage that is output from the RMS to DC converter circuit 48 and the reference voltage exceed ±2% of the required output voltage of the fuse current circuit 14.

The output of the error circuit 50 is also input to a pulse width modulator circuit 56. The pulse width modulator circuit 56 modulates the output of the error circuit based on the magnitude of the output of the error circuit 50 to produce pulses of widths which vary depending on the magnitude of the output of the error circuit 50. Thus, if the voltage delivered to the load after scaling by the instrumentation amplifier circuit 46 and conversion to direct current by the RMS to DC converter circuit 48 is greater than the reference voltage, the pulse width modulator circuit will generate pulses of a lesser width. If the voltage delivered to the load after scaling by the instrumentation amplifier circuit 46 and conversion to direct current by the RMS to DC converter circuit 48 is less than the reference voltage, the pulse width modulator circuit will generate pulses of a greater width.

A duty cycle control circuit 58 ensures that if the voltage supplied to the load becomes too low, the voltage supplied to the load will continue uninterrupted. A fast turn off circuit 60 includes a transistor 61 to enhance the switching of the pulse width modulator circuit 56.

A field effect transistor (FET) 62 accepts the output of the pulse width modulator circuit 56 as an input to its gate terminal. The FET 62 will remain in a conducting state for the duration of the pulses produced by the pulse width modulator circuit 56. Thus, if the output voltage supplied to the load is too low (below the ±2% tolerance permitted), the conduction time of the FET 62 will be increased to compensate for the reduced output voltage. Conversely, if the output voltage supplied to the load is too high (above the ±2% tolerance permitted), the conduction time of the FET 62 will be decreased to compensate for the increased output voltage. A current sense circuit 64 ensures that too much current is not drawn through the FET 62 so as to damage the FET 62 when the FET 62 is in a conducting state.

Figure 3:
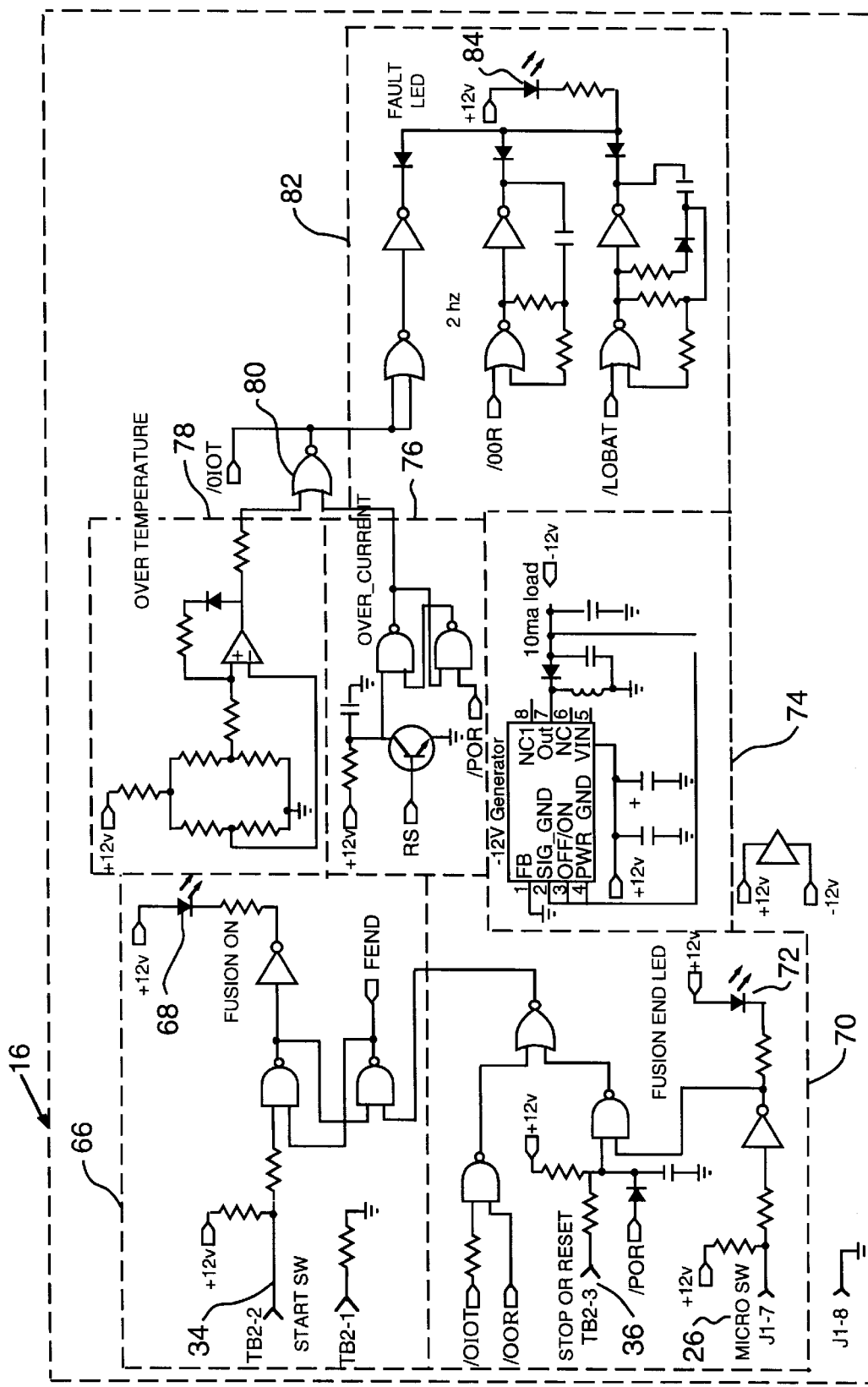
FIG. 3 is a circuit schematic of a preferred embodiment of the control/display circuit of the electrofusion apparatus of FIG. 1.

FIG. 3 illustrates a circuit schematic of a preferred embodiment of the control/display circuit 16 of the main circuit 12 of FIG. 1. A fusion start circuit 66 is activated when the start switch 34 is activated. The fusion start circuit 66 illuminates a "fusion on" LED 68 which indicates that an output voltage and an output current are being supplied to the thermoplastic connector. A fusion stop/reset circuit 70 responds to the activation of the stop/reset switch 36 or the activation of the switches 26. When either of the switches 36 or 26 are activated, a fusion end LED 72 is illuminated. A signal FEND is also generated which indicates that the main circuit 12 should no longer be supplying voltage or current to the thermoplastic member.

A negative voltage generator circuit 74 generates −12 volts, which is used in the operation of the main circuit 12. An over current circuit 76, which is responsive to the current sense circuit 64 of the fuse current circuit 14, produces an output signal if too much current is being drawn through the FET 62. An over temperature circuit 78 produces an output signal if the main circuit 12 is operating at a temperature that may be injurious to the electrofusion apparatus 10.

A NOR gate 80 gates the outputs of the over current circuit 76 and the over temperature circuit 78. The output of the NOR gate 80 is input to a fault circuit 82. The fault circuit 82 illuminates a "fault" LED 84 if the low battery signal of the low battery detector circuit 44 is active, the out of regulation signal of the out of regulation circuit 54 is active, the output signal of the over current circuit 76 is active, or the output signal of the over temperature circuit 78 is active.

Figure 4:
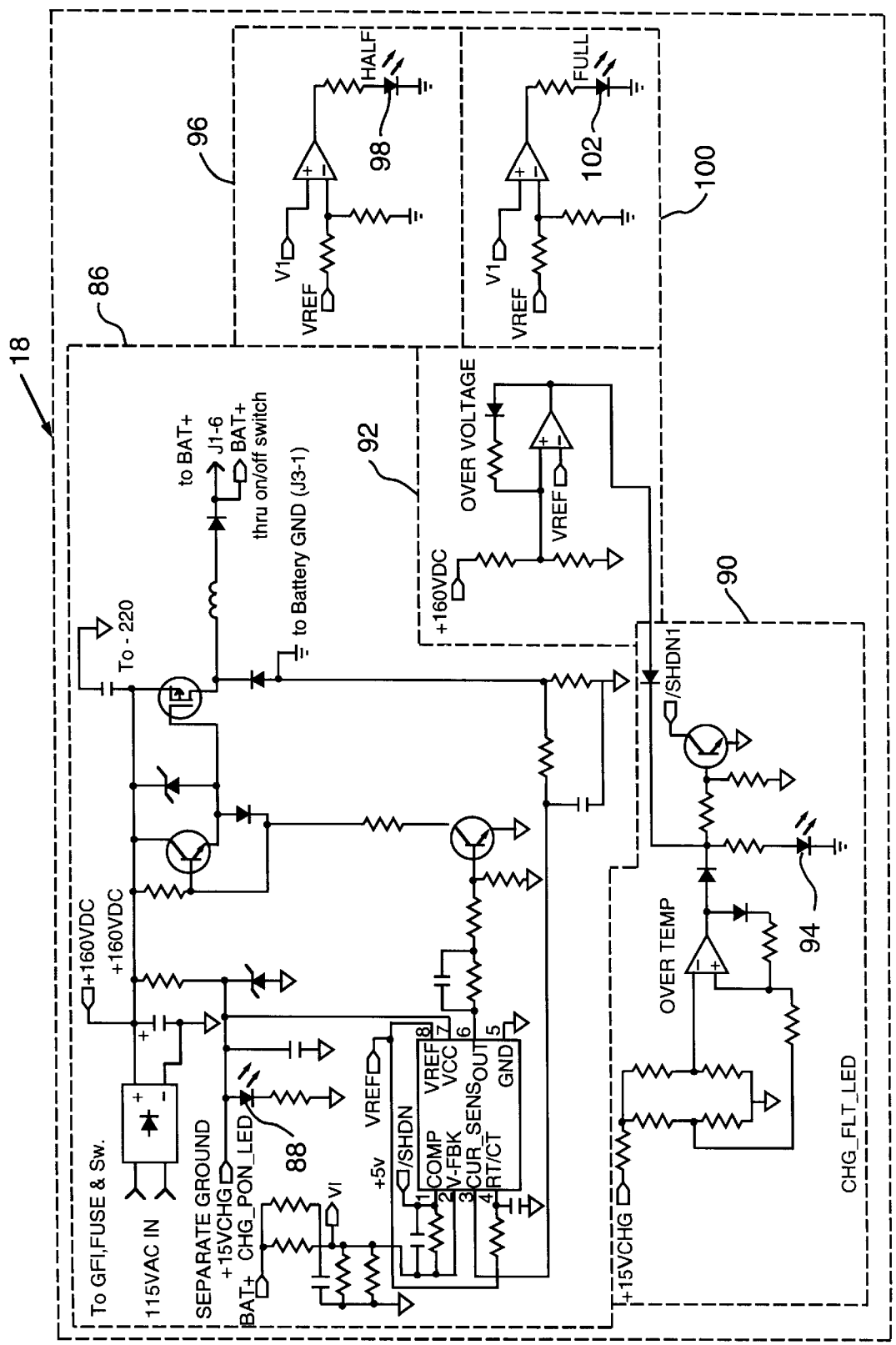
FIG. 4 is a circuit schematic of a preferred embodiment of the charger circuit of the electrofusion apparatus of FIG. 1.
Figure 5:
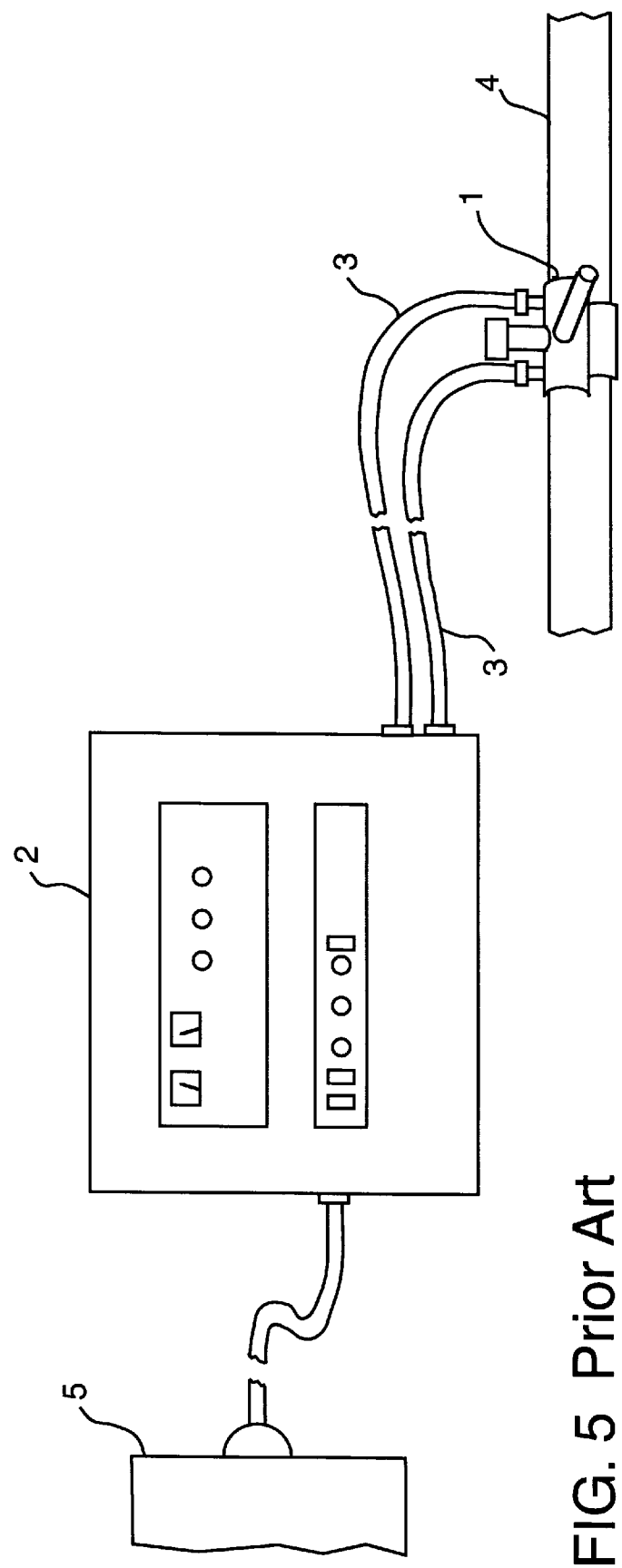
FIG. 5 is a diagram illustrating an electrofusion apparatus and a thermoplastic tapping tee of the relevant art.

FIG. 4 illustrates a circuit schematic of a preferred embodiment of the charger circuit 18 of the main circuit 12 of FIG. 1. In the preferred embodiment of FIG. 4, the charger circuit 18 is a trickle charger. A battery charger circuit 86 accepts 115 volts ac and provides a direct current voltage to charge the direct current power source 20. A CHG_PON LED 88 is illuminated while the battery charger circuit 86 is charging the direct current power source 20.

An over temperature circuit 90 determines if the operating temperature of the charger circuit 18 is above a threshold temperature (i.e. 100° C.). An over voltage circuit 92 determines if the charger circuit 18 is operating above a threshold voltage (i.e. 115±10 v). If the charger circuit 18 is operating above either the threshold temperature or the threshold voltage, a CHG_FLT LED 94 is illuminated.

A half charge circuit 96 monitors the voltage of the direct current power source 20 and illuminates a "half charge" LED 98 if it is half charged. A full charge circuit 100 monitors the voltage of the direct current power source 20 and illuminates a "full charge" LED 102 if it is fully charged.

The present invention also contemplates a method for creating an electrofused union between a plurality of thermoplastic members. At least one of the members has an electrically resistive element embedded therein. The method comprises the steps of generating a direct current voltage from a direct current source and transmitting the direct current voltage to the electrically resistive element.

The method has the advantage that it is more reliable, easier to implement, and produces electrofusion welds of higher fusion quality than methods employing alternating current. Furthermore, the present method does not require the use of an inconvenient, expensive, and potentially dangerous alternating current generating source.

While the present invention has been described in conjunction with preferred embodiments thereof, many modifications and variations will be apparent to those of ordinary skill in the art. The foregoing description and the following claims are intended to cover all such modifications and variations.

VII. CLAIMS

What is claimed is:

1. A method for creating an electrofused union between a plurality of thermoplastic members, wherein at least one of the members has an electrically resistive element embedded therein, comprising the steps of:

generating a direct current voltage from a direct current supply;

transmitting said direct current voltage to the electrically resistive element; and regulating said direct current voltage transmitted to the electrically resistive element substantially at a predetermined direct current voltage.

2. The method of claim 1 wherein said predetermined direct current voltage is approximately 39.5 volts.

3. The method of claim 1 further comprising the step of charging said direct current power supply.

4. The method of claim 1 further comprising the step of ending the transmission of said direct current voltage in response to a control signal.

5. An electrofusion system, comprising:

a direct current power supply;

a fuse current circuit responsive to said direct current power supply for generating a direct current voltage;

at least one thermoplastic member, said member having an electrically resistive element; and at least one electrical lead connected to enable dc current to flow between said fuse current circuit and said resistive element.

6. The system of claim 5 further comprising a charger circuit connected to said direct current power supply, said charger circuit for charging said direct current power supply.

7. The system of claim 6 wherein said charger circuit includes a trickle charger circuit.

8. The system of claim 6 wherein said charger circuit includes a ground fault interrupt circuit.

9. The system of claim 5 further comprising a control/display circuit connected to said fuse current circuit.

10. The system of claim 5 wherein said direct current power supply is a 48 volt power supply.

11. The system of claim 5 wherein said direct current power supply is comprised of four 12 volt batteries connected in series.

12. The system of claim 11 wherein said batteries are rechargeable batteries.

13. The system of claim 5 wherein said direct current voltage is approximately 39.5 volts.

14. An electrofusion apparatus for electrofusing a thermoplastic member having an electrically resistive element to another thermoplastic member, comprising:

a direct current power supply;

a fuse current circuit responsive to said direct current power supply for generating a direct current voltage; and at least one electrical lead connected to enable dc current to flow between said fuse current circuit and the resistive element.

15. A method for creating an electrofused union between a plurality of thermoplastic members, wherein at least one of the members has an electrically resistive element embedded therein, comprising the steps of:

generating a pulse width modulated direct current signal from a direct current power supply;

regulating a direct current voltage based on said pulse width modulated direct current signal;

transmitting said direct current voltage to the electrically resistive element; and adjusting said pulse width modulated direct current signal such that said regulated direct current voltage is substantially a predetermined direct current voltage.

16. An electrofusion system, comprising:

means for generating a direct current voltage from a direct current power supply;

means for transmitting said direct current voltage to an electrically resistive element embedded in a thermoplastic member; and means for regulating said direct current voltage transmitted to said electrically resistive element at substantially a predetermined direct current voltage.

17. The electrofusion system of claim 5, wherein said fuse current circuit includes a first circuit for determining a difference between said direct current voltage supplied to said resistive element and a predetermined direct current voltage.

18. The electrofusion system of claim 17, wherein said fuse current system includes a second circuit coupled to said first circuit for regulating said direct current voltage supplied to said resistive element substantially at said predetermined direct current voltage.

19. The electrofusion apparatus of claim 14, wherein said fuse current circuit includes a first circuit for determining a difference between said direct current voltage supplied to said resistive element and a predetermined direct current voltage.

20. The electrofusion apparatus of claim 19, wherein said fuse current system includes a second circuit coupled to said first circuit for regulating said direct current voltage supplied to said resistive element substantially at said predetermined direct current voltage.

* * * * *